(12) United States Patent
Suzuki et al.

(10) Patent No.: US 7,264,565 B2
(45) Date of Patent: *Sep. 4, 2007

(54) TRANSFER GUIDE FOR HIGH-SPEED POWER TRANSMISSION

(75) Inventors: Kenshi Suzuki, Osaka (JP); Masatoshi Sonoda, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 558 days.

This patent is subject to a terminal disclaimer.

(21) Appl. No.: 10/766,379

(22) Filed: Jan. 27, 2004

(65) Prior Publication Data

US 2005/0014589 A1   Jan. 20, 2005

(30) Foreign Application Priority Data

Jan. 28, 2003   (JP) .............................. 2003-019110

(51) Int. Cl.
 *B62J 13/06*   (2006.01)
 *F16H 7/18*    (2006.01)
(52) U.S. Cl. ..................... 474/144; 474/140; 474/147
(58) Field of Classification Search ................ 474/111, 474/140, 144, 145, 147–148, 156, 230–231; 280/304.3; 180/219; 74/89.21, 89.12, 502.3; 271/204, 277; 198/836, 838, 841
See application file for complete search history.

(56) References Cited

U.S. PATENT DOCUMENTS

| | | | | |
|---|---|---|---|---|
| 2,128,310 A | * | 8/1938 | Margles | 198/332 |
| 4,471,851 A | * | 9/1984 | Kamiya et al. | 474/144 |
| 4,498,890 A | * | 2/1985 | Sutherland | 474/140 |
| 4,609,365 A | * | 9/1986 | Eberle | 474/154 |
| 4,869,708 A | * | 9/1989 | Hoffmann et al. | 474/140 |
| 5,320,582 A | * | 6/1994 | Takeda | 474/140 |
| 5,810,687 A | * | 9/1998 | Yang | 474/147 |
| 6,213,462 B1 | * | 4/2001 | Schmidt | 271/204 |
| 6,402,137 B1 | * | 6/2002 | Gunschera | 474/231 |
| 6,435,994 B1 | * | 8/2002 | Friedmann et al. | 474/111 |
| 7,011,207 B2 | | 3/2006 | Suzuki et al. | |

FOREIGN PATENT DOCUMENTS

| | | | |
|---|---|---|---|
| DE | (443192) | * | 4/1926 |
| EP | (0711725) | * | 5/1996 |
| EP | (0878434 A2 | * | 11/1998 |
| GB | (422184) | * | 10/1933 |
| JP | 09-079333 | | 3/1997 |

* cited by examiner

*Primary Examiner*—Marcus Charles
(74) *Attorney, Agent, or Firm*—Woodling, Krost and Rust

(57) ABSTRACT

A transfer guide for a high-speed power transmission, which can cancel a change in a transmission chain speed so that smooth transmission timing can be realized and a driving power and vibration noises of the transmission chain can be significantly reduced. A curve track T for a transfer guide 100 for a high-speed power transmission disposed in a transfer position X2 just before a transmission chain, which is traveled at a fixed speed by pressing the chain on the inner circumferential side of the chain with a travel limiting guide R, is meshed with a sprocket S, is defined along an movement passage of the roller C2 in the transfer position X2. Thus, the change in the transmission chain speed is canceled so that smooth transmission timing can be reliably realized and the driving power and vibration noise of the transmission chain can be significantly reduced.

1 Claim, 6 Drawing Sheets

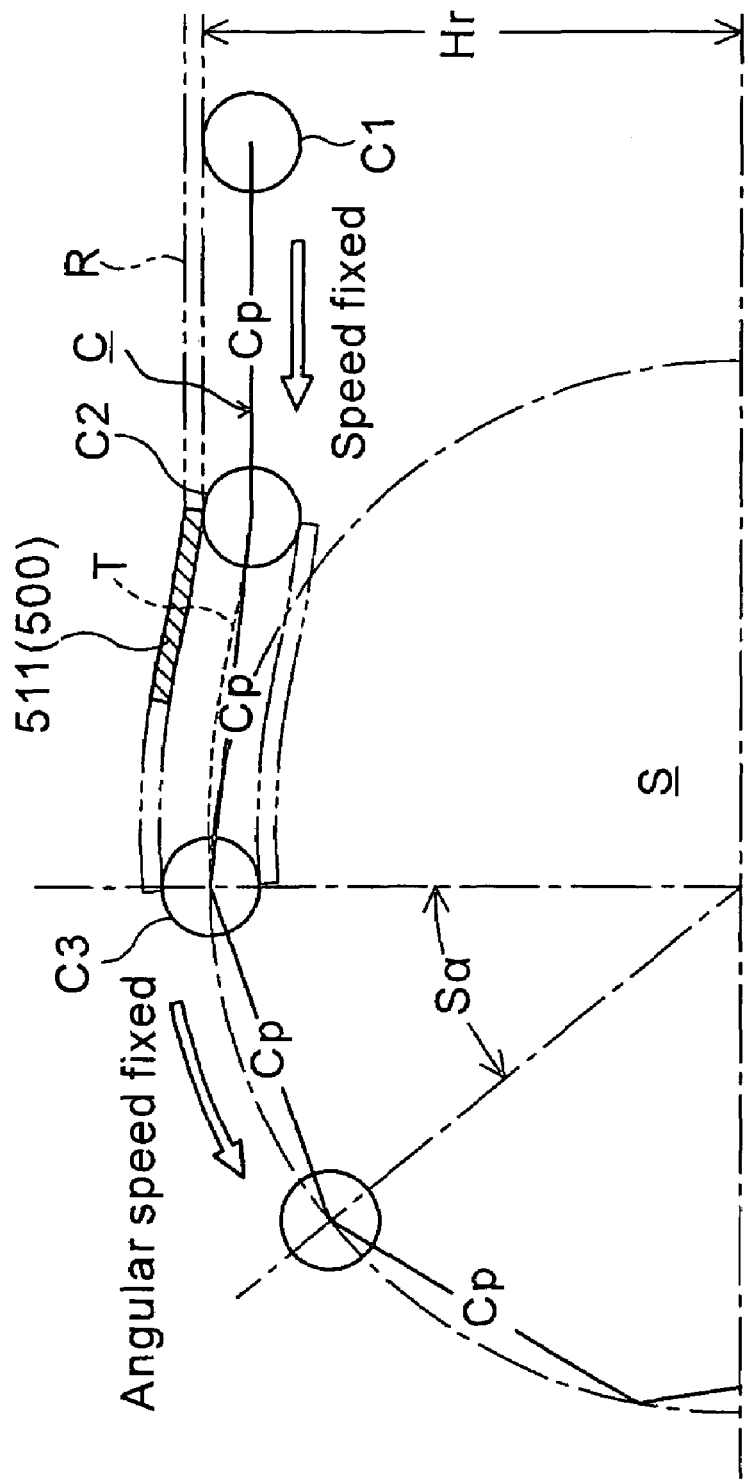

TRANSFER GUIDE FOR HIGH-SPEED POWER TRANSMISSION

TECHNICAL FIELD TO WHICH THE INVENTION PERTAINS

The present invention relates to a transfer guide, which is used for canceling a change in the speed of a power transmission chain, which is meshed with a sprocket to perform a polygonal motion in a power transmitting mechanism, which rotates a camshaft of an internal combustion engine such as a vehicle engine at high speed at a desired timing.

RELATED ART

As a related art there is a path guide for a high-speed power transmission, disposed in the vicinity of a position where a chain is meshed with a sprocket along a traveling direction of said chain, and including a guide surface, which supports the rollers of the chain, in such a manner that the weight of a part of the chain, which advances to said sprocket, is not applied on surfaces of the sprocket teeth as much as possible, and vibration and noise, which is generated in a chain transmission device, which transmits power between sprockets rotated at high speed (see Japanese Laid-open Patent Publication No. (Hei) 9-79333 on page 1, FIG. 1)

PROBLEMS TO BE SOLVED BY THE INVENTION

However, a conventional pass guide for high-speed power transmission is designed in such a manner that the centers of the rollers pivot-connected to a roller chain are advanced from a direction of a tangential direction to a meshing pitch circle formed in the sprocket. Accordingly, when the number of teeth of the sprocket is small, a significant change in the speed of a roller chain is caused by a polygonal motion, which is generated by the rotation of the sprocket.

Further, with high speed rotation of the sprocket, which is rotated at a fixed speed, due to such a significant change in the roller chain speed, intermittent transmission loads, which are produced in the sprocket and the roller chain, are increased, and this intermittent load of the sprocket not only exerts a subtly bad effect on transmission timing for an internal combustion engine such as a vehicle engine through a camshaft, but also is liable to lose durability of a chain power transmission mechanism composed of a roller chain and a sprocket.

There is a further problem that solving the above-mentioned problem requires an excessively large sized and high-strengthened roller chain so that an excessive driving power is spent. Further, there is a problem that power transmission vibration and noise are remarkably increased.

Accordingly, the objects of the present invention are to solve the above-mentioned related art problems and to provide a transfer guide for a high-speed power transmission, which can cancel a change in a transmission chain speed so that smooth transmission timing can be realized and a driving power and vibration noises of the transmission chain can be significantly reduced.

MEANS FOR SOLVING THE PROBLEMS

The invention of the instant application solves the above-mentioned problems with a transfer guide for a high-speed power transmission disposed in a transfer position just before a transmission chain, which is traveled at a fixed speed by pressing the chain on the inner circumferential side of the chain with a travel limiting guide, is meshed with a sprocket, which is rotated at a fixed speed, and including a curve track to cancel an change in the speed generated in the rollers of said transmission chain, which performs a polygonal motion at a meshing position just after said transmission chain was meshed with said sprocket, characterized in that when three rollers in the transmission chain, which are continued at desired chain pitches, are to be meshed with the sprocket while being opened on an outer circumferential side of the chain from the travel limiting guide, in such an arrangement traveling state that always corresponds to a travel limiting position, a transfer position and a meshing position, said curve track is defined along an movement passage of the roller in said transfer position.

The invention solves the above-mentioned problems by utilizing said curved track formed by continuous two arc-shaped curves.

"The travel limiting position" in the present invention, means a movement region where a transmission roller, which is traveled at a fixed speed, in a manner pressed on an inner circumferential side of the chain with a travel limiting guide including a linear track and a curve track, travels on the travel limiting guide, the transfer position means a movement region where the roller in the transmission chain sent from the travel limiting guide approaches a sprocket to mesh with the sprocket, and the "meshing position" means a movement region of a roller which have just meshed with the sprocket until a subsequent roller meshes with the sprocket.

Action

According to the transfer guide for a high-speed power transmission of the present invention, three rollers in a transmission chain, which are continued at desired chain pitches and are traveled at a fixed speed by being pressed by a travel limiting guide including a linear track or a curve track in an inner circumferential side of the chain, are to be meshed with a sprocket, which is rotated at a fixed speed, while being opened on an outer circumferential side of the chain from the travel limiting guide, in such an arrangement traveling state that always corresponds to a travel limiting position, a transfer position and a meshing position.

Then in the transfer guide for the high-speed power transmission according to the present invention, the curve track is defined along a movement passage of the roller in the transfer position. Accordingly, this curve track meshes with the sprocket during high speed rotation whereby a periodic change in the speed of the transmission chain, which performs polygonal motion is canceled to remove the speed variations of the transmission chain.

The invention will be better understood when reference is made to the BRIEF DESCRIPTION OF THE DRAWINGS, DETAILED DESCRIPTION OF THE INVENTION AND CLAIMS.

BRIEF DESCRIPTION OF THE DRAWINGS

FIG. 6 is an arrangement view of a transfer guide for a high-speed power transmission, which is a fifth Example of the present invention.

A better understanding of the invention will be had when reference is made to the DETAILED DESCRIPTION OF THE INVENTION and CLAIMS which follow hereinbelow.

EMBODIMENTS OF THE INVENTION

Figure 1:
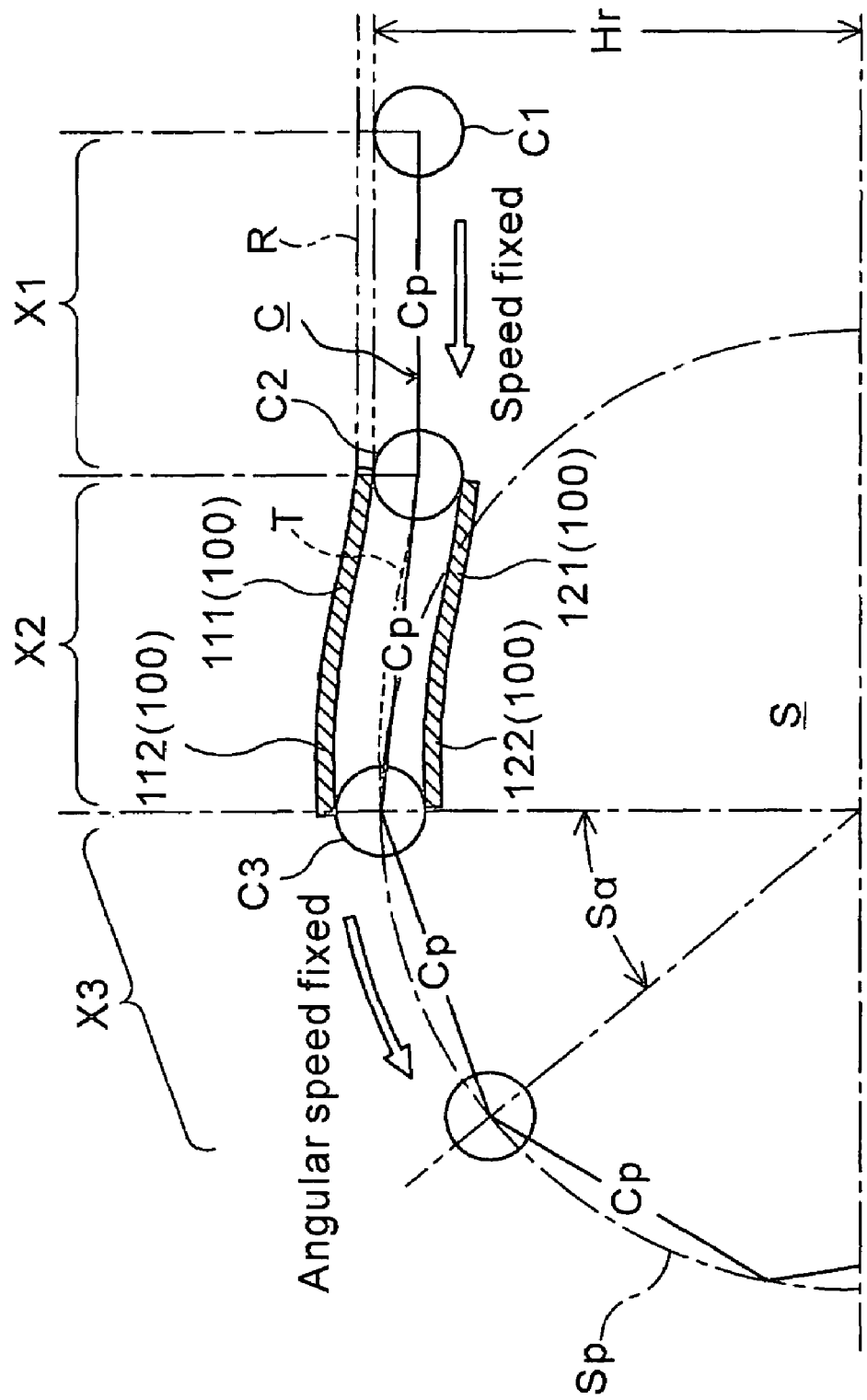
FIG. 1 is an arrangement view of a transfer guide for a high-speed power transmission, which is a first Example of the present invention.
Figure 3:
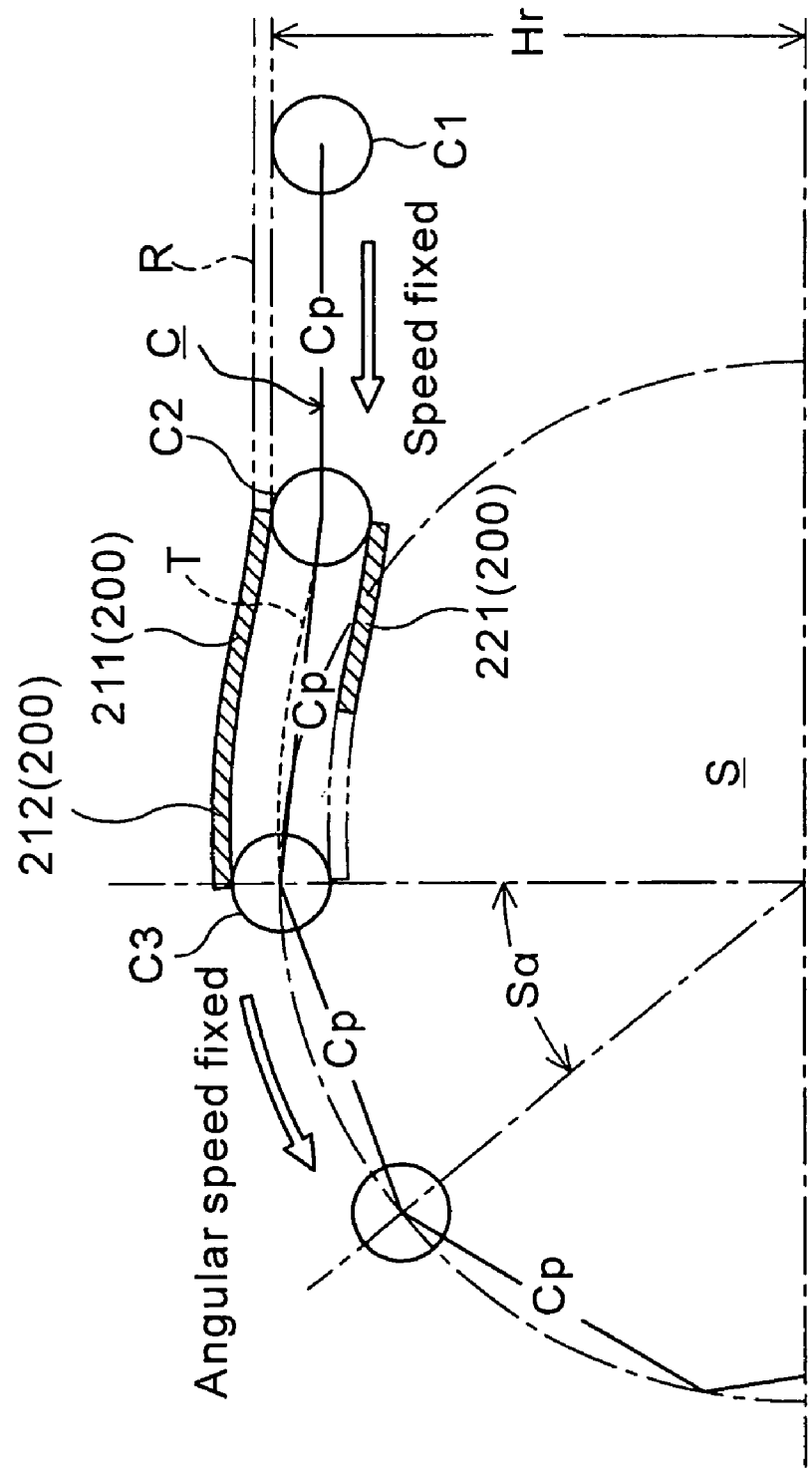
FIG. 3 is an arrangement view of a transfer guide for a high-speed power transmission, which is a second Example of the present invention.
Figure 4:
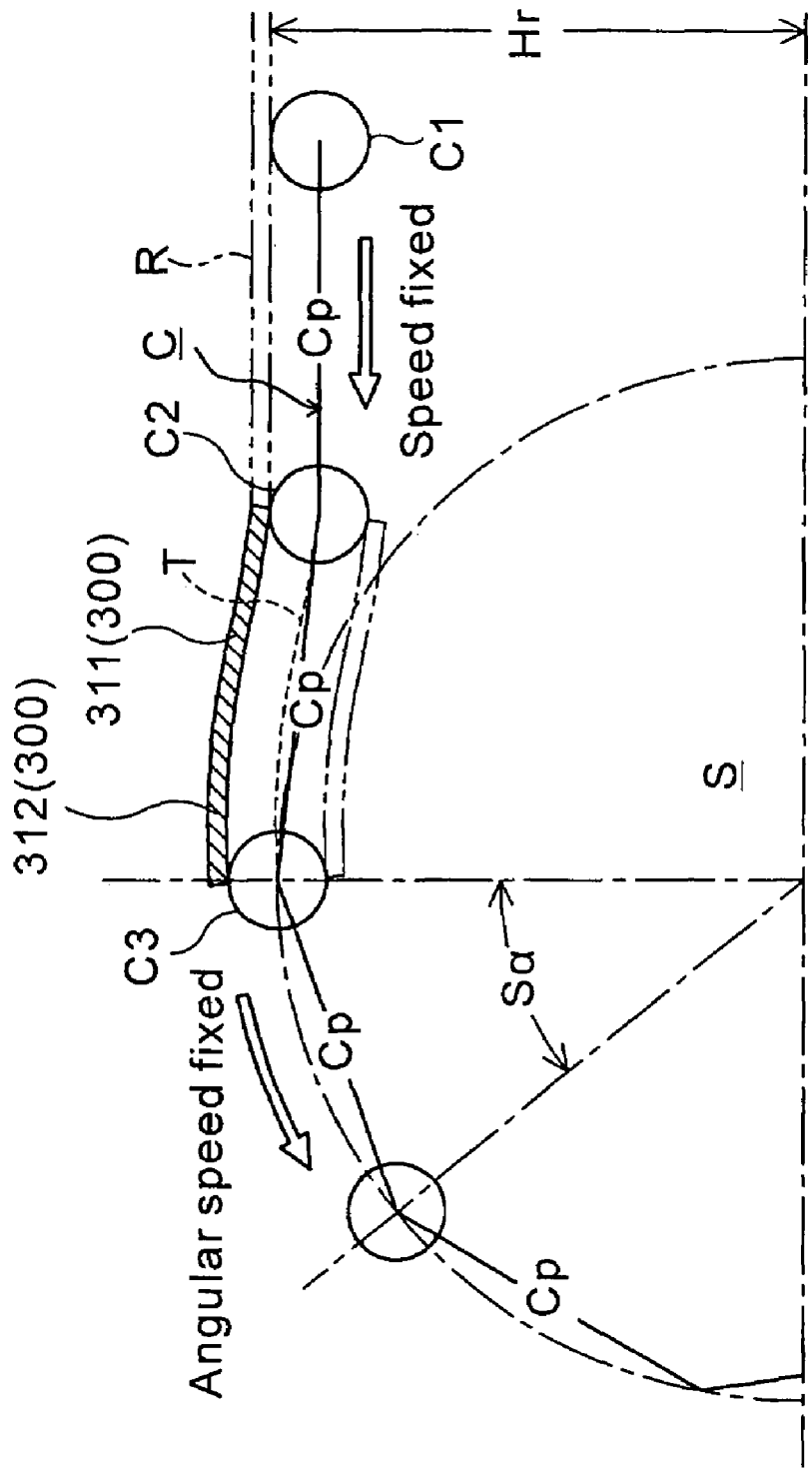
FIG. 4 is an arrangement view of a transfer guide for a high-speed power transmission, which is a third Example of the present invention.
Figure 5:
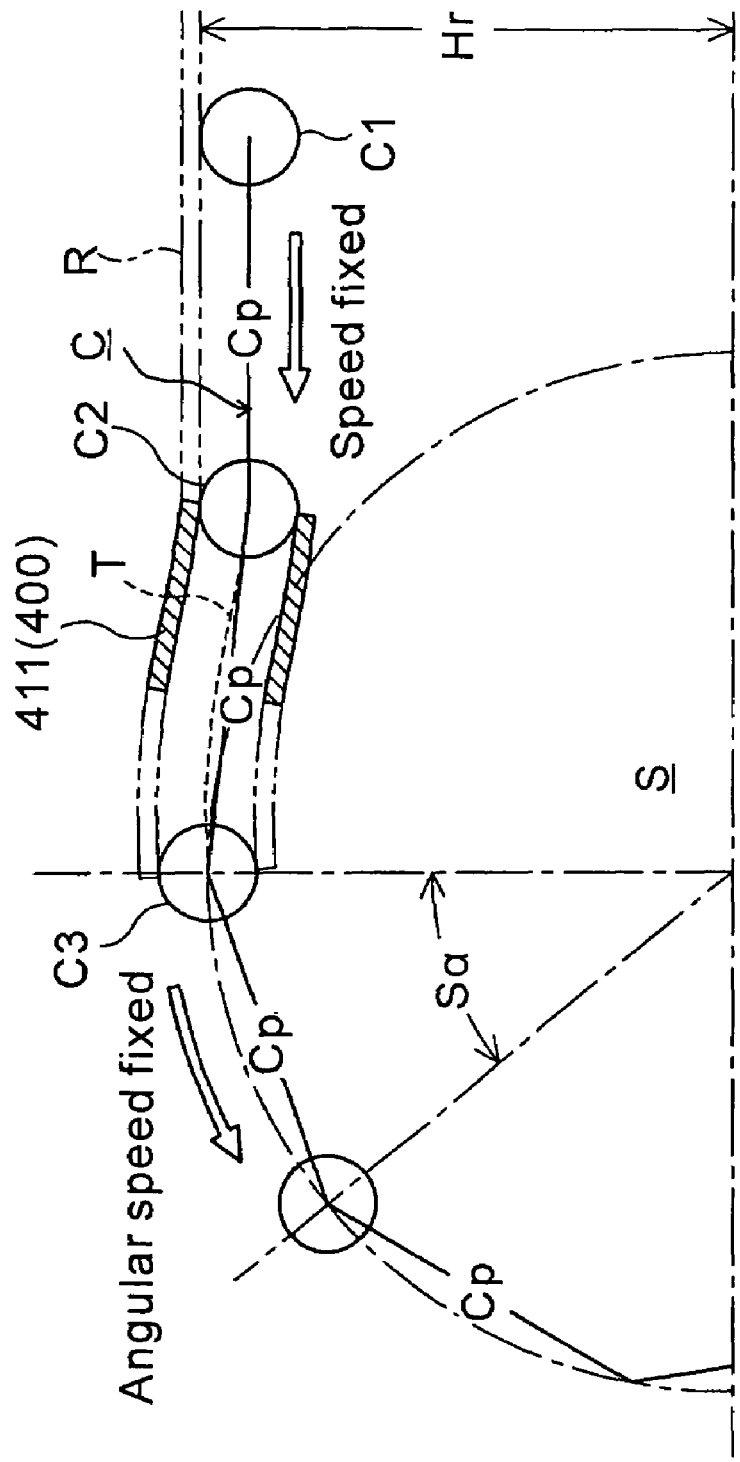
FIG. 5 is an arrangement view of a transfer guide for a high-speed power transmission, which is a fourth Example of the present invention.

Examples of preferable embodiments of a transfer guide according to the present invention will be described below with reference to drawings. FIG. 1 is an arrangement view of a transfer guide 100 for a high-speed power transmission, which is a first Example of the present invention, FIG. 2 is a view showing a movement passage of rollers in a transfer chain, FIG. 3 is an arrangement view of a transfer guide 200, which is a second Example of the present invention, FIG. 4 is an arrangement view of a transfer guide 300, which is a third Example of the present invention, FIG. 5 is an arrangement view of a transfer guide 400, which is a fourth Example of the present invention, and FIG. 6 is an arrangement view of a transfer guide 500, which is a fifth Example of the present invention.

The transfer guide 100 for the high-speed power transmission, which is the first Example of the present invention, is a transfer guide for canceling a change in the speed of transmission chain called as a timing chain, which rotates a camshaft in an automobile engine at high speed at desired timing and meshes with a sprocket S to perform a polygonal motion, as shown in FIG. 1. The transfer guide 100 for the high-speed power transmission is disposed in a transfer position X2 just before a transmission chain C in which a number of rollers C1, C2, C3, . . . were sequentially pivot-connected to each other at given chain pitches Cp and the rollers were traveled at a fixed speed by pressing the chain on the inner circumferential side of the chain with a travel limiting guide R including a linear track, is meshed with a sprocket S, which is rotated at a fixed speed. It is noted that a reference numeral Sα in FIG. 1 denotes a pitch angle per one tooth of the driving sprocket S.

Figure 2:
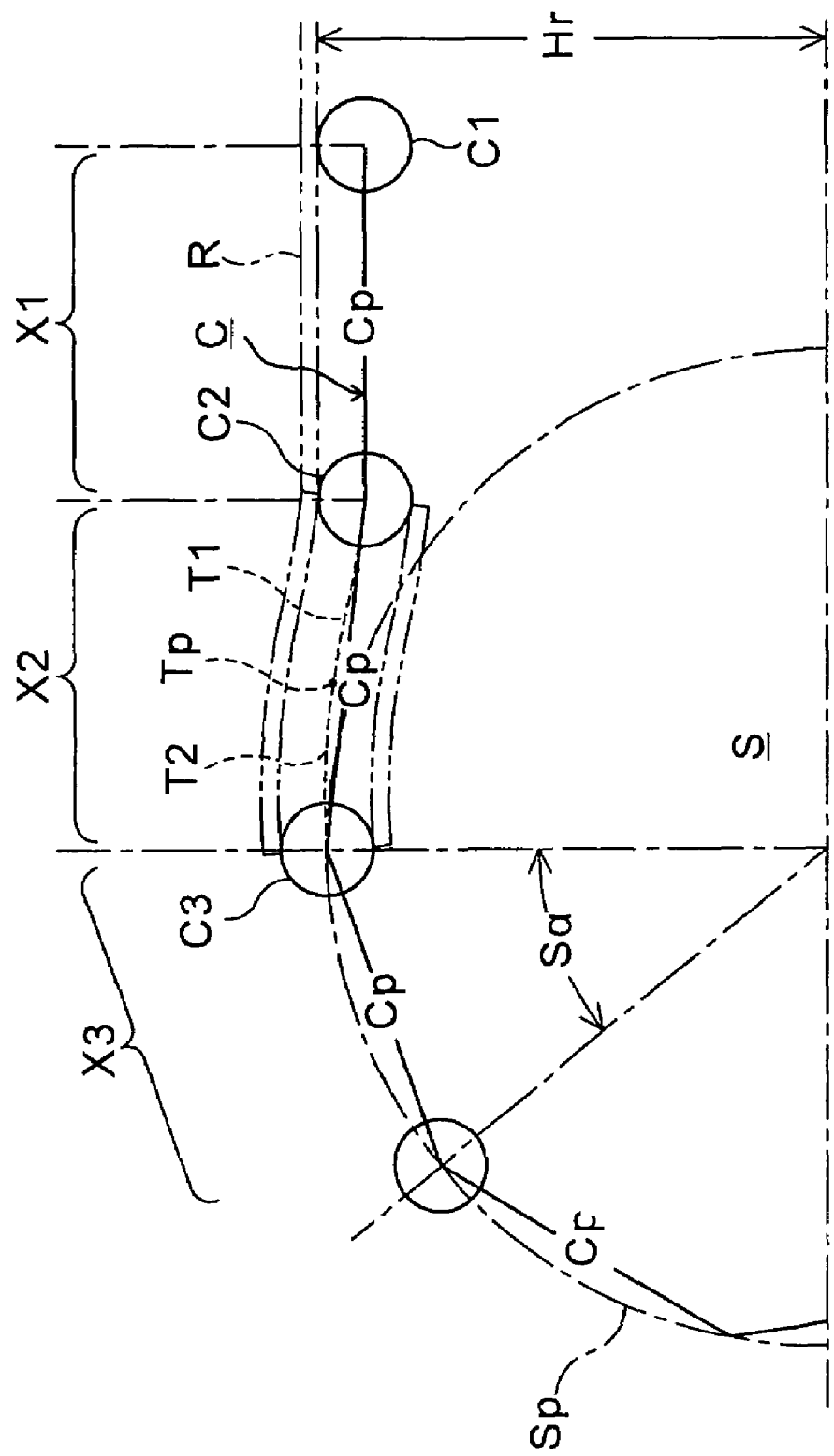
FIG. 2 is a view showing a movement passage for a transmission chain roller.

As shown in FIG. 2, when continuous three rollers C1, C2, and C3 in the transmission chain C having a desired chain pitch Cp are to be meshed with the sprocket S while being opened on the outer circumferential side from the travel limiting guide R, in arrangement traveling states, which are always corresponding to the a linear rail R for supporting the conveying surface, the travel limiting position X1, the transfer position X2 and the meshing position X3, a curve track T, which is formed in the transfer guide 100 for the high-speed power transmission of the present invention, is defined as a movement passage consisting of continuous two arc-shaped curves T1 and T2 where the roller C2 can be smoothly moved while keeping a distance of a chain pitch Cp from the roller C1 and the roller C3, respectively.

Here, "the travel limiting position X1" in the present invention means a movement region where the roller C1 in the transmission chain C, pressed on the inner circumferential side of the chain with the travel limiting guide R including a linear track to travel at a fixed speed, travels on the travel limiting guide R, "the transfer position X2" means a movement region from the end of the travel limiting guide R to a position where the roller C2 in the transmission chain C sent from the travel limiting guide R approaches the sprocket S to mesh with it, and "the meshing position X3" means for example a movement region from a position where the roller C meshed with the sprocket S to a position where the roller was moved until a subsequent roller C meshes with the sprocket S.

Further, an arrangement level Hr of the travel limiting guide R may take any arrangement level, in which the transmission chain can reliably mesh with the sprocket S while being opened on the outer circumferential side of the chain from the travel limiting guide R during high speed traveling of the transmission chain C and the above-mentioned curve track T can form continuous two arc-shaped curves T1 and T2, that is an inner circumferential side of the chain than the tangential line (not shown) of a meshing pitch circle Sp formed in sprocket S.

Further, in FIG. 2, an inflection point Tp between two arc-shaped curves T1 and T2 can be defined as a traveling position of the roller C2 when the roller C1, which is traveling on the travel limiting position X1, the roller C2, which is traveling on the transfer position X2 and the roller C3, which is traveling on the meshing position X3, were brought into a linear arrangement state.

Therefore, the transfer guide for the high-speed power transmission of the present invention can be provided on at least an outer side or an inner side of a movement passage for the transfer position X2 based on a radius of curvature of the guide taking the two arc-shaped curves T1, T2 forming the above-mentioned movement passage and the roller radii of the rollers C 1, C2, C3 into consideration.

That is the transfer guide 100 for the high-speed power transmission of the first Example shown in FIG. 1 comprises outer guides 111, 112 and inner guides 121, 122 provided along the movement passage taking the radii of the rollers at the transfer position X2 into consideration. Next, the transfer guide 200 for the high-speed power transmission of the second Example shown in FIG. 3 comprises outer guides 211, 212 and an inner guide 221 provided along the movement passage taking the radii of the rollers at the transfer position X2 into consideration. Next, the transfer guide 300 for the high-speed power transmission of the third Example shown in FIG. 4 comprises outer guides 311, 312 provided along the movement passage taking the radii of the rollers at the transfer position X2 into consideration. Also the transfer guide 400 for the high-speed power transmission of the fourth Example shown in FIG. 5 comprises an outer guide 411 and inner guide 421 provided on the side of the travel limiting guide R in the movement passage taking the radii of the rollers at the transfer position X2 into consideration, and the transfer guide 500 for the high-speed power transmission of the fifth Example shown in FIG. 6 comprises an outer guide 511 provided on the side of the travel limiting guide R in the movement passage taking the radii of the rollers at the transfer position X2 into consideration.

In the transfer giddes 100, 200, 300, 400 and 500 for the high-speed power transmission of the present invention obtained as mentioned above, when continuous three rollers C1, C2, and C3 in the transmission chain axe to be meshed with the sprocket S while being opened on the outer circumferential side of the chain from the travel limiting guide R toward the sprocket S, in arrangement traveling states, which are always corresponding to the transfer position X1, the transfer position X2 and the meshing position X3, a transfer position X2 just before the meshing with the driving sprocket S is defined along a movement passage consisting of continuous two arc-shaped curves T1 and T2 where the roller C2 can be smoothly moved while keeping a distance of a chain pitch Cp from the roller C1 and the roller C3, respectively. Accordingly, such a guide track T absorbs an change in the speed of the transmission chain C, which meshes with the sprocket S to perform a polygonal motion, so as to cancel the change, whereby the speed variation of the transmission chain C can be removed.

Therefore, according to the transfer guide for the high-speed power transmission of the present invention, even if the transmission chain C used as a timing chain for an automobile engine was traveled at high speed, a change in the speed of the transmission chain C, which meshes with the sprocket S to perform polygonal motion, is cancelled by the curve track T so that smooth transmission timing can be realized. Further, the durability of a chain power transmission mechanism can be ensured for a long period of time without the need of excessive driving power unlike conventional cases. Additionally, since a change in tension of the transmission chain C can be removed, the miniaturization of the transmission chain C can be attained and transmission vibration and noise can be reduced. Thus, the effects of the present invention are very significant.

EFFECTS OF THE INVENTION

According to the present invention, when three rollers in a transmission chain, which are continued at desired chain pitches and are traveled at a fixed speed by being pressed by a travel limiting guide including a linear track or a curve track in an inner circumferential side of the chain, are to be meshed with a sprocket, which is rotated at a fixed speed, while being opened on an outer circumferential side of the chain from the travel limiting guide, in such an arrangement traveling state that always corresponds to a travel limiting position, a transfer position and a meshing position, the curve track in the transfer guide for the high-speed power transmission is defined along a movement passage of the roller in the transfer position. Accordingly, even if the transmission chain is traveled at high speed, this curve track cancels a change in the speed of the transmission chain, which meshes with the sprocket to perform polygonal motion so that the speed variations of the transmission chain can be removed. Thus, the change in the transmission chain speed is canceled so that smooth transmission timing can be reliably realized and the driving power and vibration noise of the transmission chain can be significantly reduced.

DESCRIPTION OF REFERENCE NUMERALS 100, 200, 300, 400, 500 . . . Transfer guide for a high-speed power transmission
111, 211, 311, 411, 511 . . . Outer guide provided on a travel limiting guide R side
112, 212, 312 . . . Outer guide provided on a sprocket S side
121, 221, 421 . . . Inner guide provided on the travel limiting guide R side
122 . . . Inner guide provided on the sprocket S side
S . . . Sprocket
Sp . . . Meshing pitch circle for the sprocket S
Sα . . . Pitch angle for the sprocket S
C . . . Transmission chain
C1 . . . Roller traveling on the travel limiting guide R
C2 . . . Roller sent from the travel limiting guide R
C3 . . . Roller, which have been just meshed with the sprocket S
Cp . . . Chain pitch
R . . . Travel limiting guide
X1 . . . Travel limiting position
X2 . . . Transfer position
X3 . . . Meshing position
T . . . Guide track
T1, T2 . . . Arc-shaped curve
Tp . . . Inflection point between arc-shaped curves T1 and T2
Hr . . . Arrangement level of the travel limiting guide R The invention has been described herein by way of example only and those skilled in the art will readily recognize that changes may be made to the invention as described herein without departing from the spirit and scope of the claims which follow hereinbelow.

The invention claimed is:

1. A transfer guide for use with a high-speed power transmission, comprising;
   a transmission chain travelling at a fixed first speed;
   said transmission chain includes rollers having radii;
   said chain and said rollers have an inner circumferential side and an outer circumferential side;
   a sprocket rotating at a fixed angular speed and moving said transmission chain at a second fixed speed;
   a travel limiting guide pressing said inner circumferential side of said chain and said roller such that said chain and said rollers are positioned to enter said sprocket and a transfer guide;
   said rollers of said transmission chain being meshed with said sprocket;
   a curved track;
   said curved track cancels any change in speed of said rollers of said transmission chain;
   said chain moving polygonally after said rollers of said chain mesh with said sprocket;
   said rollers spaced apart at desired chain pitches;
   said outer circumferential side of said chain being open;
   said curved track includes an outer guide for engaging said inner circumferential side of said rollers;
   wherein said curved track is formed by two continuous arc-shaped curves, and, said arc-shaped curves have a common inflection point, and,
   said outer guide and said travel limiting guide are movable and press on said rollers of said chain enabling rollers of different radii to be used.

* * * * *

UNITED STATES PATENT AND TRADEMARK OFFICE
CERTIFICATE OF CORRECTION

PATENT NO. : 7,264,565 B2  Page 1 of 1
APPLICATION NO. : 10/766379
DATED : September 4, 2007
INVENTOR(S) : Kenshi Suzuki and Masatoshi Sonoda It is certified that error appears in the above-identified patent and that said Letters Patent is hereby corrected as shown below:

Column 1, line 20, after "of" delete "said" insert --the--.

Column 1, line 22, after "to" delete "said" insert --the--.

Column 1, line 63, after "reduced" insert --SUMMARY OF THE INVENTION--.

Column 2, line 16, after "position," delete "said" insert --the--.

Column 2, line 17, after "in" delete "said" insert --the--.

Column 2, line 19, after "utilizing" delete "said" insert --the--.

Column 2, line 54, after "the" insert --sections entitled--.

Column 2, line 55, after "INVENTION" delete "AND" insert --and--.

Column 3, line 11, after "the" insert --sections entitled--.

Column 3, line 13, after "hereinbelow." insert --DETAILED DESCRIPTION OF THE INVENTION--.

Column 4, line 58, after "transfer" delete "giddes" insert --guides--.

Column 4, line 61, after "chain" delete "axe" insert --are--.

Column 4, line 66, after "the" delete "transfer" insert --travel limiting --.

Signed and Sealed this

Sixth Day of November, 2007

JON W. DUDAS
*Director of the United States Patent and Trademark Office*